United States Patent
Ding (10) Patent No.: US 10,078,381 B2
(45) Date of Patent: *Sep. 18, 2018

(54) VEHICLE INTERIOR CONTROL SYSTEM HAVING KNOBS WITH PLURALITY OF DISPLAY REPRESENTATIONS

(71) Applicant: THUNDER POWER NEW ENERGY VEHICLE DEVELOPMENT COMPANY LIMITED, Central (HK)

(72) Inventor: Jia-Wei Ding, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 25 days.

This patent is subject to a terminal disclaimer.

(21) Appl. No.: 15/273,035

(22) Filed: Sep. 22, 2016

(65) Prior Publication Data
US 2017/0177097 A1   Jun. 22, 2017

Related U.S. Application Data

(63) Continuation of application No. 14/977,618, filed on Dec. 21, 2015, now Pat. No. 9,477,329.

(51) Int. Cl.
*G06F 3/033* (2013.01)
*G06F 3/0362* (2013.01)
(Continued)

(52) U.S. Cl.
CPC ........... *G06F 3/0362* (2013.01); *B60K 35/00* (2013.01); *G05G 1/08* (2013.01); *B60K 37/06* (2013.01);
(Continued)

(58) Field of Classification Search
CPC ..................................................... G06F 3/0362
(Continued)

(56) References Cited

U.S. PATENT DOCUMENTS 9,477,329 B1    10/2016  Ding
2006/0017585 A1  1/2006  Lenneman et al.
(Continued)

FOREIGN PATENT DOCUMENTS

DE    10121685 A1   11/2002
DE    102007035564 A1   1/2009

OTHER PUBLICATIONS

U.S. Appl. 14/977,618, filed Dec. 21, 2015, Non Final Rejection dated Apr. 14, 2016, all pages.
(Continued)

*Primary Examiner* — Long D Pham
(74) *Attorney, Agent, or Firm* — Kilpatrick Townsend & Stockton LLP (57) ABSTRACT

System for controlling the interior of a vehicle including a center button for selecting a mode, an inner knob for selecting a function, and an outer knob for adjusting that function. The system may include an outer display for graphically displaying different options for adjusting the selected function. The system may also include a processor which may generate instructions to effectuate the function adjustment upon the user actuating the knobs and/or the center button. A display on the center button may display modes, and an inner display located behind the inner knob may display functions.

15 Claims, 9 Drawing Sheets

(51) Int. Cl.
*B60K 35/00* (2006.01)
*G05G 1/08* (2006.01)
*G06F 3/0484* (2013.01)
*B60K 37/06* (2006.01)

(52) U.S. Cl.
CPC .................. *B60K 2350/102* (2013.01); *B60K 2350/1004* (2013.01); *B60K 2350/1024* (2013.01); *G05G 1/087* (2013.01); *G06F 3/04847* (2013.01)

(58) Field of Classification Search
USPC ........................................................ 345/184
See application file for complete search history.

(56) References Cited

U.S. PATENT DOCUMENTS

| | | |
|---|---|---|
| 2007/0008305 A1 | 1/2007 | Kosinski et al. |
| 2009/0085880 A1 | 4/2009 | Vitale et al. |
| 2010/0141610 A1* | 6/2010 | Yoneji ................ B60H 1/00985 345/184 |
| 2011/0016428 A1* | 1/2011 | Lupton, III ........... G06F 3/0362 715/830 |
| 2011/0025488 A1 | 2/2011 | Leon |
| 2011/0025652 A1 | 2/2011 | Bonne |
| 2014/0183011 A1 | 7/2014 | Park et al. |
| 2016/0121825 A1* | 5/2016 | Kim .................... B60R 16/0373 701/36 |

OTHER PUBLICATIONS

U.S. Appl. No. 14/977,618, filed Dec. 21, 2015, Notice of Allowance dated Jul. 20, 2016, all pages.

European Search Report for EP 16205695 dated Dec. 7, 2017, all pages.

\* cited by examiner

VEHICLE INTERIOR CONTROL SYSTEM HAVING KNOBS WITH PLURALITY OF DISPLAY REPRESENTATIONS

CROSS-REFERENCE TO RELATED APPLICATION

The present application is a continuation of U.S. nonprovisional application Ser. No. 14/977,618, filed Dec. 21, 2015, the entire disclosure of which is incorporated by reference herein in its entirety.

BACKGROUND

Vehicle manufacturers have added a number of new features to vehicle interior cabins over the last few decades to make their operation more comfortable and efficient. These features include: modern A/C and heating systems, GPS, satellite radio, back-up cameras, side cameras, seat warmers, power seat adjusters, power sun roof, power windows, automatic parking, etc. As more and more features are added, the control panel and dashboard of a vehicle become increasingly complex and cluttered, and the available space for controls for these features becomes increasingly scarce.

Some limitations of current control systems are that they occupy too much space and their control is not intuitive. Some manufacturers have attempted to solve the problem with touch screens that allow users to navigate through a series of screens in order to adjust some interior setting. However, these systems can be complex to use and may require significant screen area.

BRIEF SUMMARY

Systems for controlling one or more functions provided by a vehicle are disclosed. The systems may enable a user to select, from a plurality of functions provided by the vehicle, a function for control, to select a parameter value for the selected function, to select a mode for the selected function and/or to perform any other appropriate operations. In certain embodiments, a system in accordance with the disclosure may comprise a center button for selecting a mode, an inner knob for selecting a function, and an outer knob for controlling that function. Such a system may include an outer display for graphically displaying for the user one or more different options for adjusting the selected function. The system may include a processor which may be configured to generate instructions to effectuate the function adjustment upon the user actuating the knobs and/or the center button.

In certain embodiments, a system in accordance with the disclosure may include a display on the center button for displaying modes, and an inner display located behind the inner knob for displaying functions. The display on the center button may display a list of modes or the currently selected mode, and likewise the inner display may display a list of functions or the currently selected function. The system may include a center button and an inner knob that are fastened together so that when one is moved the other likewise moves. In certain embodiments, the buttons, knobs, and/or displays include in the system may be in circular shapes.

A given mode that may be by selected by the user via the systems disclosed may include a driver mode, a passenger mode, a zone mode, a mode that includes all passengers, and/or any other modes. A given function that may be selected by the user for control via the systems disclosed may include a temperature function, a wind magnitude function, a wind direction function, a seat adjustment function, a seat temperature function, and/or any other function(s) that may be provided by the vehicle. In certain embodiments, a system in accordance with the disclosure may include a feature where the center button, inner knob, and inner display are collapsed to form a planar surface that is flush with the outer display. In certain embodiments, the inner and outer knobs may be rotated into either a discrete number of positions or a continuous range of positions.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

Described herein, are embodiments for a vehicle interior control system that represent a significant improvement to currently available control systems. Embodiments of the disclosed vehicle interior control system simultaneously minimize space while maximizing control by allowing a user to iterate through a wide range of functions using a button and knob configuration. Many manufacturers employ a touch screen system to adjust interior conditions of a vehicle, however touch screens can be difficult to use in a moving vehicle, and do not necessarily reduce the amount of occupied space on a vehicle's control panel or dashboard. A control system in accordance with the present disclosure is easy to interact with for the user, and in some embodiments, a user may adjust a vehicle's interior conditions by listening to audio commands that recite the currently selected mode, function, or parameter. Thus, this may lead to increased vehicle safety.

Figure 1:
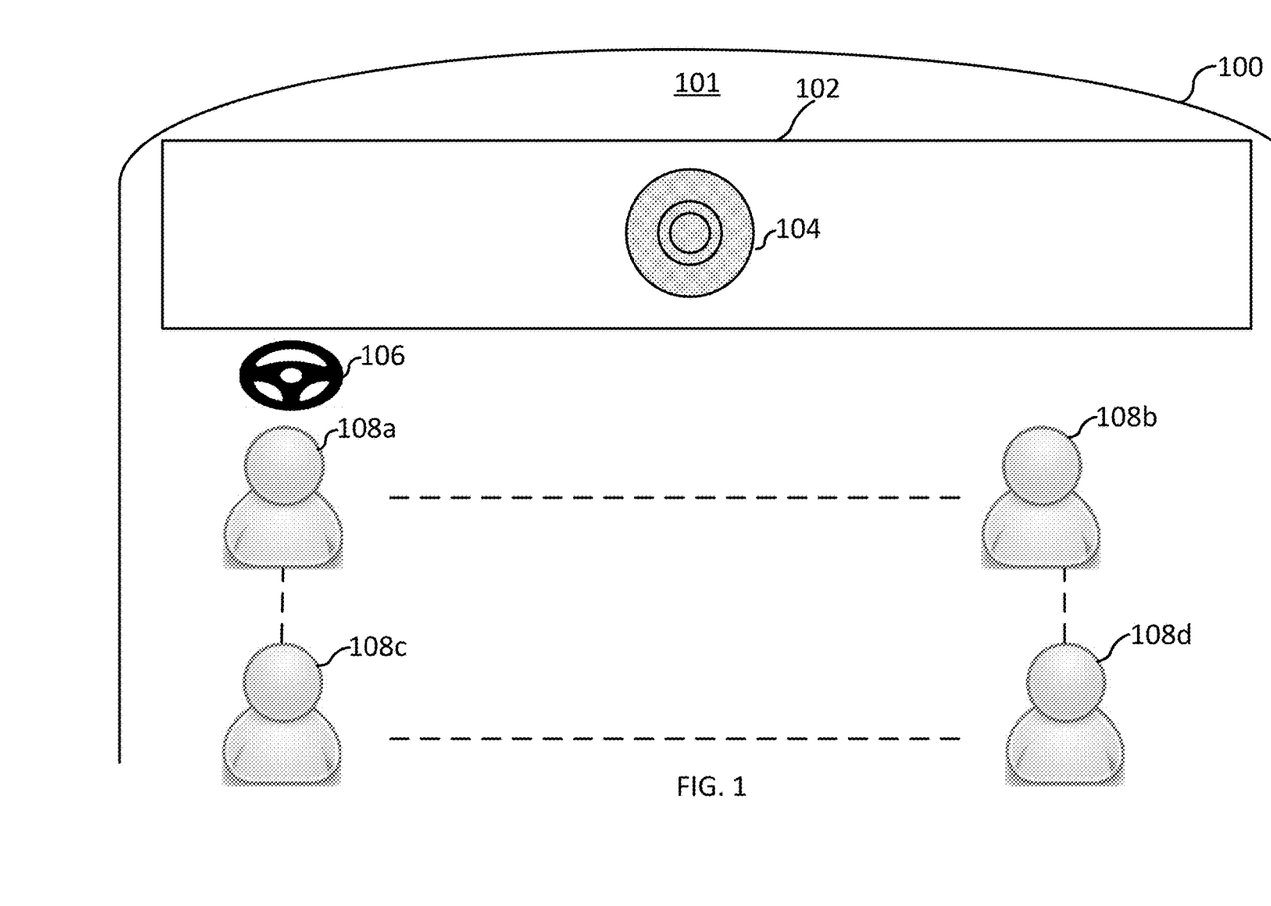
FIG. 1 shows a vehicle interior control inside a transportation apparatus, according to an exemplary embodiment of the present disclosure.

FIG. 1 generally illustrates an exemplary embodiment of a vehicle interior control 104 on a dashboard 102 in a transportation apparatus 100. Transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, transportation apparatus 100 is an electrical automobile. As shown, transportation apparatus 100 may include a cabin 101 with a volume.

As shown in FIG. 1, transportation apparatus 100 may comprise one or more steering wheels 106 in cabin 101. Although only one steering wheel 106 is shown in FIG. 1, this is not intended to be limiting. In some examples, transportation apparatus 100 may include more than one steering wheel 106. For example, it is contemplated that transportation apparatus 100 may be an aircraft that comprises at least a main steering wheel 106 for the main pilot and at least a secondary steering wheel 106 for a co-pilot.

As also shown in FIG. 1, one or more users 108 may be arranged to occupy their corresponding positions in cabin 101. Users 108 may include one or more drivers that control the movement or navigation of transportation apparatus 100, one or more passengers, and/or any other type of users 108. In this example, user 108a is a driver that controls the driving of transportation apparatus 100, while other users 108, e.g., users 108b-d, are passengers. As still shown, there may be multiple rows of users 108 within cabin 101 of transportation apparatus 100.

In some embodiments, vehicle interior control 104 can be accessed by any one of users 108. In some embodiments, vehicle interior control 104 does not necessarily need to be located on dashboard 102, but may be located at any location within transportation apparatus 100, including a location on steering wheel 106. Furthermore, vehicle interior control 104 can be used to adjust interior conditions for any one of users 108. For example, user 108a may use vehicle interior control 104 to adjust certain interior conditions for user 108d, e.g., seat temperature, seat adjustment, etc. Similarly, user 108b may use vehicle interior control 104 to adjust certain interior conditions for all users 108, e.g., air temperature.

Figure 2A:
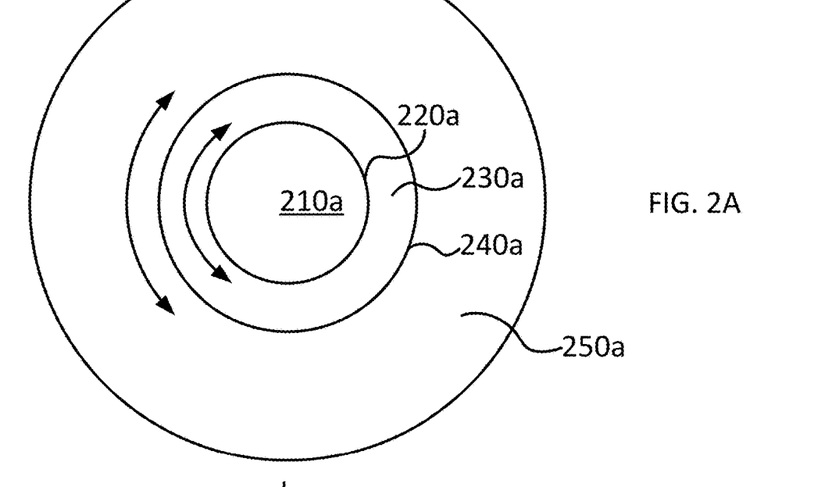
FIG. 2 shows three different views of a vehicle interior control, according to an exemplary embodiment of the present disclosure.
Figure 2B:
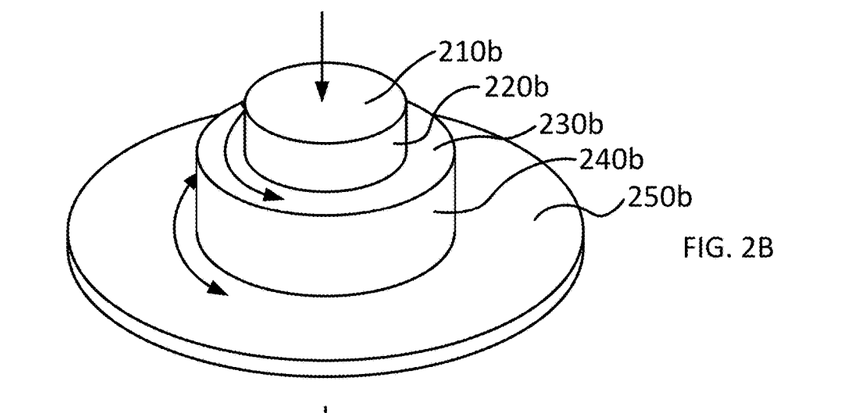
Figure 2C:
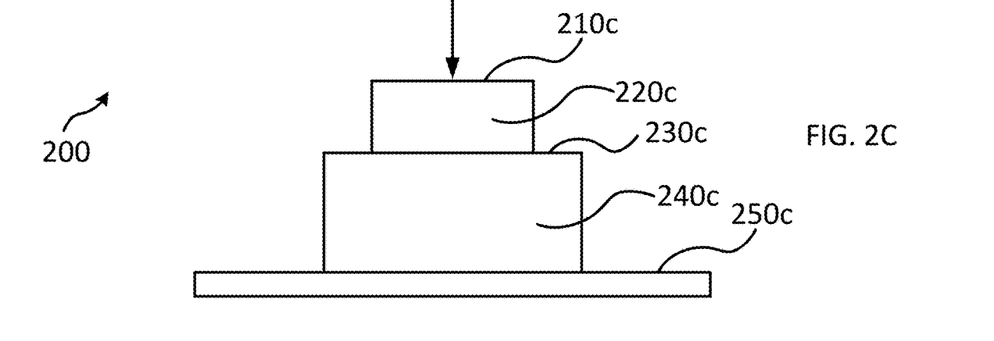

FIG. 2 shows three different views of a vehicle interior control 200, according to an exemplary embodiment of the present disclosure. FIG. 2A shows a top view, FIG. 2B shows a perspective view, and FIG. 2C shows a side view. In some embodiments, as shown in FIG. 2, vehicle interior control 200 comprises a center button 210 surrounded by an inner knob 220, an inner display 230 surrounded by an outer knob 240, and an outer display 250. In some embodiments, vehicle interior control 200 comprises three different inputs through which a user may interact: center button 210 is able to be pushed, inner knob 220 is able to be rotated, and outer knob 240 is able to be rotated. These basic user input features are denoted in FIG. 2 with arrows. In other embodiments, other inputs may be available to a user. For example, inner display 230 may be pushed or rotated, outer display 250 may be pushed or rotated, center button 210 may contain a fingerprint scanner, center button 210 may contain a microphone through which a user may audibly input commands, etc.

Although FIG. 2 shows vehicle interior control 200 as having mostly circular components, this is not intended to be limiting. It should be understood that in some embodiments of the present disclosure the components are not circular. For example, in some embodiments center button 210 may be a triangle, square, hexagon, octagon, etc. Furthermore, inner knob 220 and outer knob 240 may be the same shape as center button 210, or each may be a different shape. Outer display 250 in particular may take on a wide number of irregular shapes. In some embodiments, outer display 250 may take on the shape of the surface on which vehicle interior control 200 is placed. For example, outer display may take on a rectangular shape when it is positioned on a center console, or on the vehicle dashboard.

In some embodiments, center button 210 and inner knob 220 are distinct from each other and can be actuated independently from each other. In some embodiments, center button 210 may be secured to inner knob 220 such that by pressing center button 210, inner knob 220 is also pressed, and similarly by rotating inner knob 220, center button 210 is also rotated. In some embodiments, inner display 230 and outer knob 240 are distinct from each other and can be actuated independently from each other. In some embodiments, inner display 230 may be secured to outer knob 240 such that by rotating outer knob 240, inner display 230 is also rotated. In some embodiments, outer knob 240 may be secured to outer display 250 such that by rotating outer knob 240, outer display 250 is also rotated.

In some embodiments, not only are inner display 230 and outer display 250 capable of displaying information, but center button 210 may also be capable of displaying information. All displays on vehicle interior control 200 may be digital displays, such as those using LCD, plasma, or OLED technologies, or may they may be analog displays. Displays may also be configured to give a user feedback when an input is actuated, such as moving an indicator light or graphic as a knob is rotated or a button is pressed.

Vehicle interior control 200 can have a wide range of physical dimensions. In some embodiments, center button 210 is one-half inch to three inches in diameter, inner display 230 is one inch to five inches in diameter, and outer display 250 is two inches to ten inches in diameter. Furthermore, in some embodiments, inner knob 220 is one-half inch to two inches in height, and outer knob 240 is one-half inch to two inches in height. In some embodiments, vehicle interior control 200 may have dimensions much smaller or much larger than these ranges.

Figure 3:
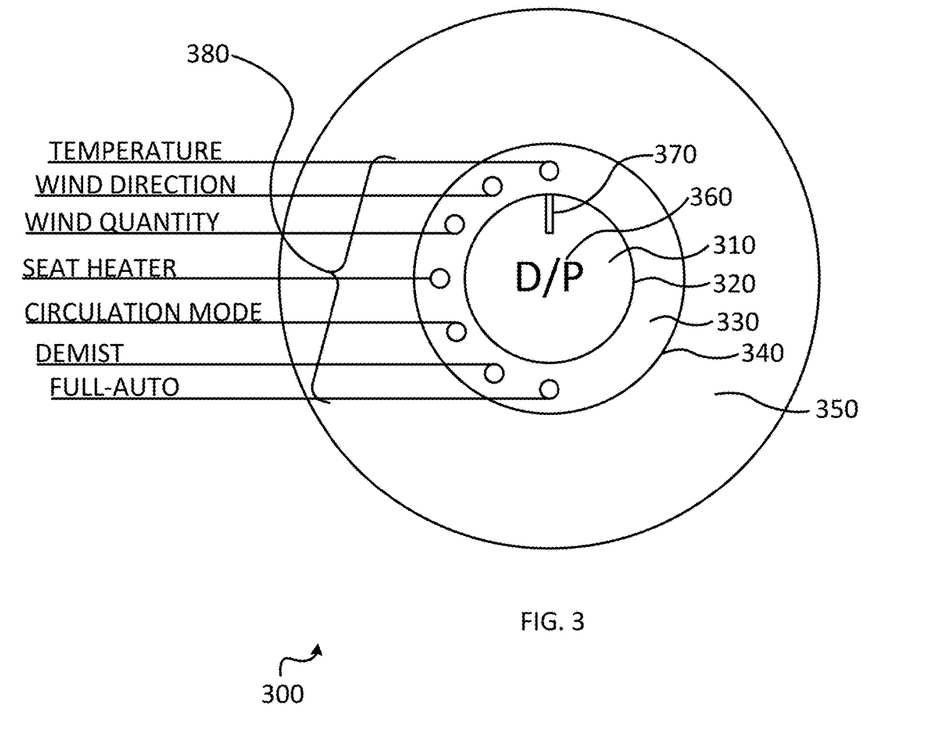
FIG. 3 shows a vehicle interior control, according to an exemplary embodiment of the present disclosure.

FIG. 3 shows a vehicle interior control 300, according to an exemplary embodiment of the present disclosure. Similar to the vehicle interior control shown in FIG. 2, vehicle control 300 comprises a center button 310 surrounded by an inner knob 320, an inner display 330 surrounded by an outer knob 340, and an outer display 350.

In some embodiments, vehicle interior control 300 has a mode indicator 360. Mode indicator 360 may indicate which driver(s) or passenger(s) the vehicle interior control 300 is currently directed to. For example, if the mode "driver" is selected by a user, mode indicator 360 may display the letter "D". If the mode "passenger" is selected, mode indicator 360 may display the letter "P". Mode indicator 360 may also show "A" for "all passengers", "P 1" for "first passenger", "P2" for "second passenger", etc. In some embodiments, mode selection may be performed by pressing center button 310. For example, when the vehicle is turned on, mode indicator 360 may be turned off, and upon a user pressing center button 310 a "D" may be displayed. After pressing center button 310 a second time, a "P1" may be displayed, and after a third time, a "P2" may be displayed, etc.

In some embodiments, center button 310 is actuated by pressing. In some embodiments center button 310 may not actually physically move when pressed, behaving similar to a touch screen, and yet in other embodiments it may be pressed inward and afterwards immediately return to its initial position. In some embodiments, center button 310 may be actuated into a number of different vertical positions.

For example, center button 310 may be pressed and actuated into a first vertical position that corresponds to a first mode. It may then be pressed into a second vertical position that corresponds to a second mode. In some embodiments, when center button 310 is actuated into a new mode, a signal may be transmitted to a processor indicating that the new mode has been selected. The processor may then send signals to displays and other controllable settings within a vehicle to reflect the new selected mode.

In some embodiments, mode indicator 360 may be located somewhere other than on center button 310. For example, mode indicator 360 may be located on inner display 330, on outer display 350, or on some other location in the vehicle. In some embodiments, mode indicator 360 may be toggled by actuating an input other than by pressing center button 310. For example, in some embodiments mode indicator 360 may be toggled by rotating inner knob 320, rotating outer knob 340, or by some audible input by a user. In some embodiments, mode indicator 360 may turn off after a certain period of time. For example, mode indicator 360 may turn off after twenty seconds of inactivity on all inputs of vehicle interior control 300, and immediately turn back on once any input is actuated.

In some embodiments, vehicle interior control 300 has a function set 380 comprising a variety of different functions that correspond to different interior conditions that are capable of being adjusted. In some embodiments, function set 380 may be displayed on inner display 330 as icons, pictures, or words. In FIG. 3, function set 380 is displayed as a plurality of circles. The corresponding list of functions shown in FIG. 3 is demonstrative only, and does not in any way limit the number of functions that can be included in function set 380. Functions that may be included in function set 380 may be related to each other. For example, without limitation, function set 380 may include a set of functions related to temperate and airflow controls within the vehicle. However, it should be understood that this is not necessarily the only case. In some examples, the functions included in function set 380 may not related to each other. Examples of functions that may be part of function set 380 include: air temperature, seat temperature, wind direction, wind quantity, seat heater, seat adjuster, mirror adjuster, circulation mode, demist, defrost, defog, full-auto, power window control, window tinting, sun roof, radio, GPS, back-up camera, and/or any other function(s). In some embodiments, function set 380 is not limited to interior conditions of a vehicle, and may include features exclusively outside the vehicle cabin. For example, function set 380 may include functions relating to the vehicle's headlights, tires, engine, antenna, trunk, gas cover, etc.

In some embodiments, function set 380 may change depending on the current status of mode indicator 360. For example, if a rear passenger is currently selected as displayed by mode indicator 360, certain functions may be unavailable, such as seat heater, seat adjustment, etc. Similarly, certain functions may be unavailable when "all passengers" is selected as displayed by mode indicator 360. For example, functions that are generally designed for individual passengers, e.g., seat heater and seat adjustment, may be omitted from function set 380 when more than one person is selected via mode indicator 360. In some embodiments, the functions included in function set 380 may be selected by the user. For example, without limitations, the user may be enabled to add or remove a function from the function set.

In some embodiments, a function is selected from function set 380 by rotating inner knob 320. In some embodiments inner knob 320 may not actually physically move when rotated, behaving similar to a touch screen, and yet in other embodiments it may be rotated over a range of discrete or continuous rotational positions. For example, inner knob 320 may be rotated into a first rotational position that corresponds to a first function. It may then be rotated into a second rotational position that corresponds to a second function. In some embodiments, when inner knob 320 is rotated into a new function, a signal may be transmitted to a processor indicating that the new function has been selected. The processor may then send signals to displays and other controllable settings within a vehicle to reflect the new selected function.

Figure 4:
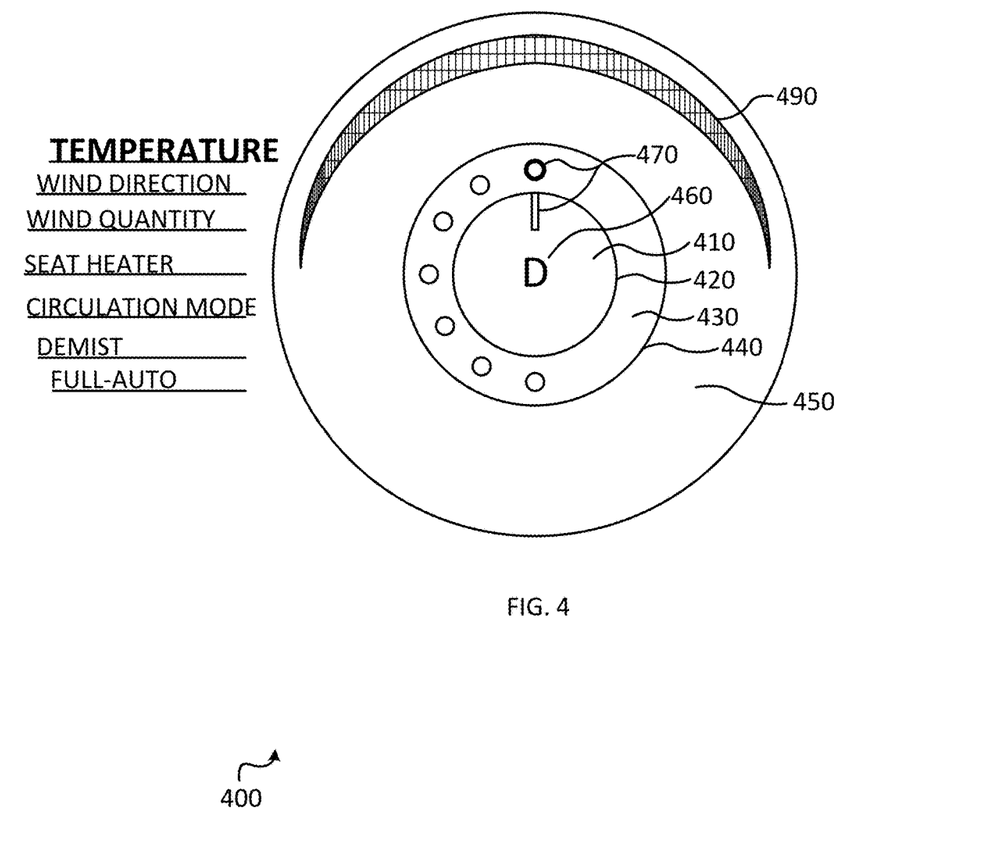
FIG. 4 shows a vehicle interior control with the temperature function selected, according to an exemplary embodiment of the present disclosure.

In some embodiments, vehicle interior control 300 has a function indicator 370 that indicates which function of function set 380 is currently selected. FIG. 3 shows function indicator 370 as a displayed line on center button 310 that points to a selected function within function set 380, which are displayed on inner display 330. However this is just one example of how function indicator 370 may be used to indicate which function is selected. For example, function indicator 370 may be on the same display as function set 380 (as shown in FIG. 4) or on different, multiple displays. In some embodiments, center button 310 may be pressed to move function indicator 370 which is displayed on outer display 350, while function set 380 is displayed on inner display 330. In other embodiments, outer knob 340 may be rotated to move function indicator 370 which is displayed on inner display 330, while function set 380 is displayed on center button 310. It is easy to see the wide range of embodiments that are available through the present disclosure.

FIG. 4 shows a vehicle interior control 400 with the temperature function selected, according to an exemplary embodiment of the present disclosure. Similar to the previous examples, vehicle control 400 comprises a center button 410 surrounded by an inner knob 420, an inner display 430 surrounded by an outer knob 440, and an outer display 450. In this example, function indicator 470 is both a line on center button 410 and a darkened circle on inner display 430.

In some embodiments, vehicle interior control 400 displays parameter values 490 on one of its displays. In FIG. 4, parameter values 490 is displayed on outer display 450. In some embodiments, parameter values 490 gives a user the ability to select a parameter value for the selected mode and function. A user may rotate outer knob 440 and scroll through various temperatures (parameter values) until they are satisfied. In some embodiments, parameter values 490 may change depending on the selected mode. For example, if mode indicator 460 displays "D", indicating the driver is selected, and a user presses center button 410 and changes it to "P2", indicating the second passenger is selected, a signal may be sent to a processor which may then modify both the temperature range (parameter values 490) and the currently selected temperature.

In some embodiments, a parameter value is selected from parameter values 490 by rotating outer knob 440. In some embodiments outer knob 440 may not actually physically move when rotated, behaving similar to a touch screen, and yet in other embodiments it may be rotated over a range of discrete or continuous rotational positions. For example, outer knob 440 may be rotated into a first rotational position that corresponds to a first parameter value. It may then be rotated into a second rotational position that corresponds to a second parameter value. In some embodiments, when outer knob 440 is rotated into a new parameter value, a signal may be transmitted to a processor indicating that the new parameter value has been selected. The processor may then send signals to displays and other controllable settings within a vehicle to reflect the new selected parameter value.

In some embodiments, mode selection, function selection, and parameter selection may be discrete or continuous processes. For example, although FIG. 4 shows a discrete mode selection ("D", "P", "P1", etc.), a discrete function selection ("temperature", "wind direction", "wind quantity", etc.), and a continuous parameter value selection (continuous range of temperatures), any one of these may change from discrete to continuous or vice versa. For example, mode indicator 460 may instead of selecting discrete passengers in the vehicle, select a certain location in the vehicle out of a continuous range of locations, e.g., "2.3 feet forward and 1.2 feet left of center of vehicle" or "3.1 feet from front of vehicle". An example of a discrete range for parameter selection will be shown in FIG. 5.

In some embodiments, vehicle interior control 400 may provide audio feedback to a user when mode indicator 460, function indicator 470, or a selected parameter value from parameter values 490 are modified. For example, by pressing center button 410, vehicle interior control 400 may output through a speaker the word "driver". Similarly, by rotating inner knob 420, vehicle interior control 400 may output through a speaker the words "seat heater". Audible feedback may, in some embodiments, provide a driver of a vehicle a method of adjusting interior conditions without taking his or her eyes off the road, increasing vehicle safety. Audible feedback additionally provides vehicle interior control 400 a way to achieve controllability without the use of mode indicator 460, function indicator 470, and inner display 430.

Figure 5:
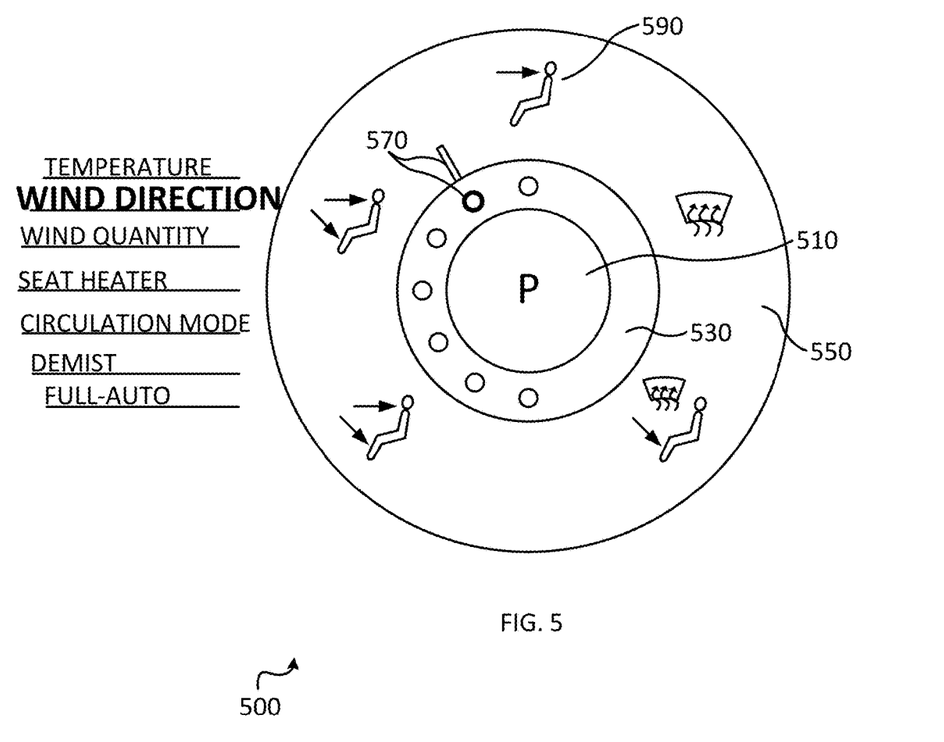
FIG. 5 shows a vehicle interior control with the wind direction function selected, according to an exemplary embodiment of the present disclosure.

FIG. 5 shows a vehicle interior control 500 with the wind direction function selected, according to an exemplary embodiment of the present disclosure. In some embodiments, the function of wind direction controls the routing of hot or cold air through the vehicle's HVAC system. Note that unlike the previous example in FIG. 5, parameter values 590 are discrete and can only take on a limited number of parameter values, which for this example is five. Furthermore, function indicator 570 is not displayed on center button 510 but is displayed on both inner display 530 and outer display 550.

Figure 6:
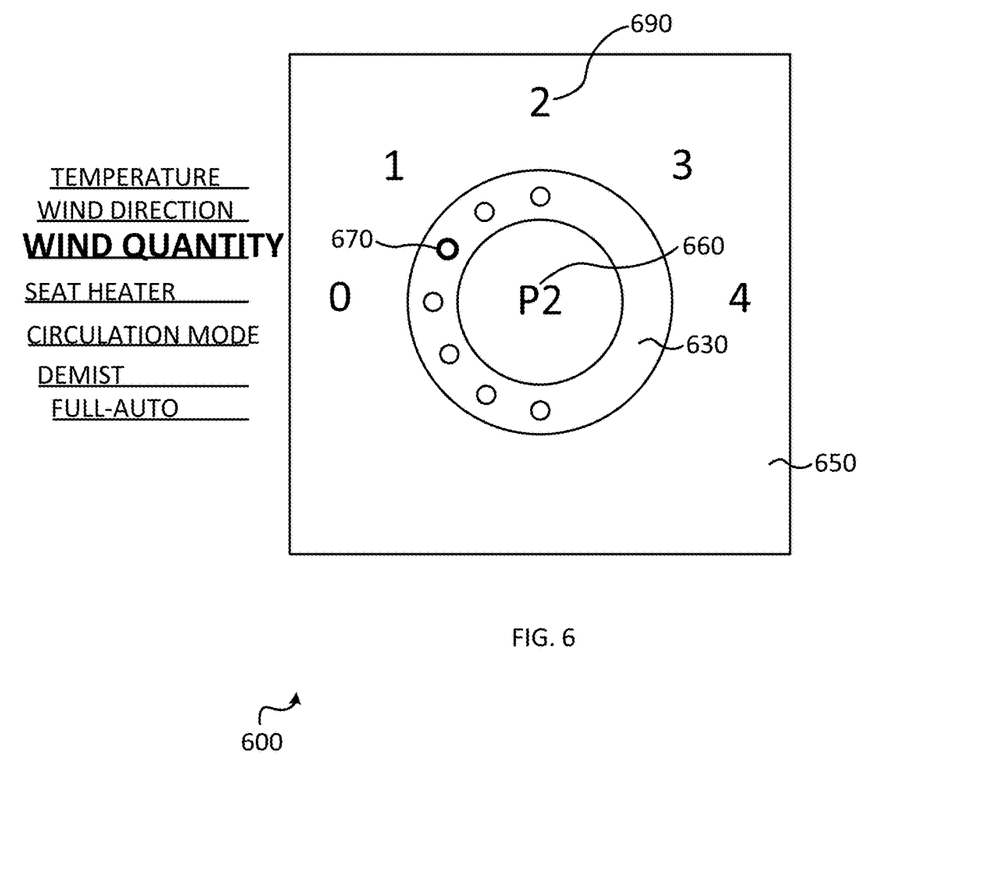
FIG. 6 shows a vehicle interior control with the wind quantity function selected, according to an exemplary embodiment of the present disclosure.

FIG. 6 shows a vehicle interior control 600 with the wind quantity function selected, according to an exemplary embodiment of the present disclosure. Vehicle interior control 600 has discrete parameter values 690 (displaying possible wind quantities from 0 to 4) displayed on outer display 650 and, unlike previous examples, has a function indicator 670 displayed solely on inner display 630. In this example, vehicle interior control 600 has a mode indicator 660 displaying "P2" which may indicate "second passenger", and may refer to some passenger in the vehicle. Note that unlike in previous examples, outer display 650 is not circular, and that outer display 650 can take on any one of a wide number of shapes.

Figure 7:
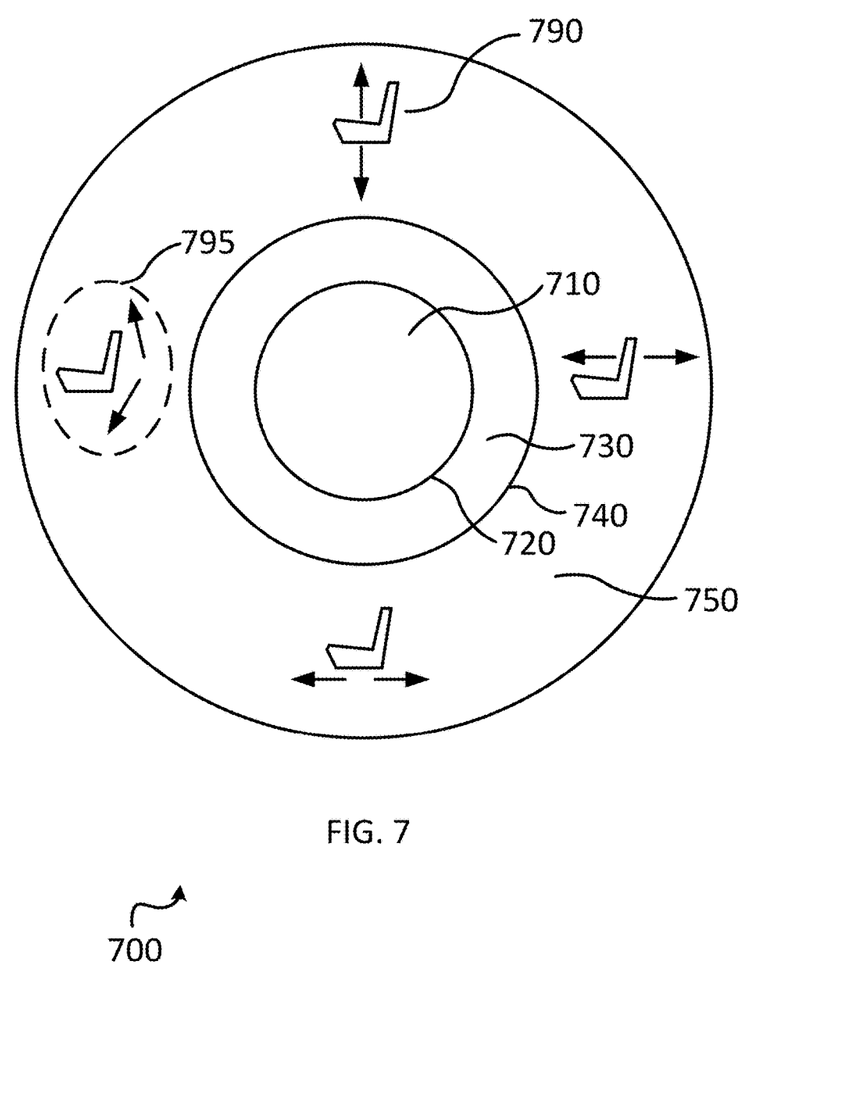
FIG. 7 shows a vehicle interior control, according to an exemplary embodiment of the present disclosure.

FIG. 7 shows a vehicle interior control 700, according to an exemplary embodiment of the present disclosure. Vehicle interior control 700 shows discrete parameter values 790 showing possible seat adjustment selections. In some embodiments, after the function and mode have been selected, the indicators that correspond to function and mode may disappear to give vehicle interior control 700 a cleaner look. In this example, vehicle interior control 700 has a center button 710 that is blank and an inner display 730 that is blank. Vehicle interior control 700 additionally shows a parameter value indicator 795 which, similar to the function indicator and mode indicator, indicates which parameter is currently being selected by the user. In some embodiments, parameter value indicator 795 may be moved to different parameter values of parameter values 790 by rotating outer knob 740. In some embodiments, parameter value indicator 795 may be moved by pressing center button 710, or by rotating inner knob 720.

Figure 8A:
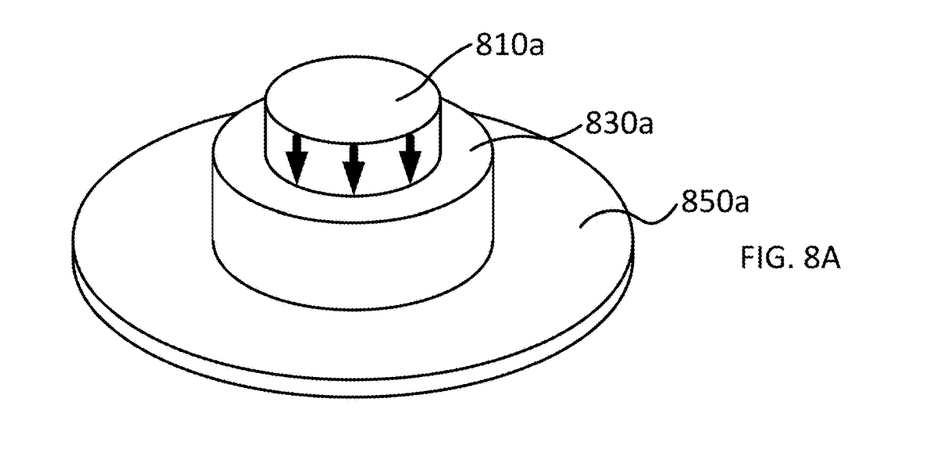
FIG. 8 shows a vehicle interior control with a collapsibility feature, according to an exemplary embodiment of the present disclosure.
Figure 8B:
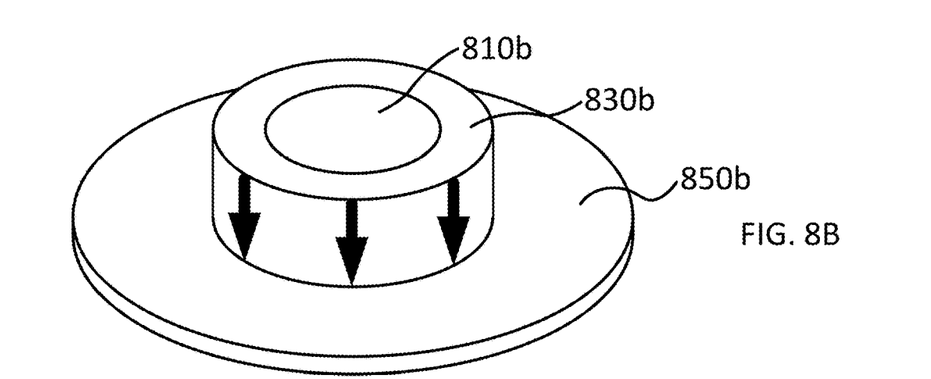
Figure 8C:
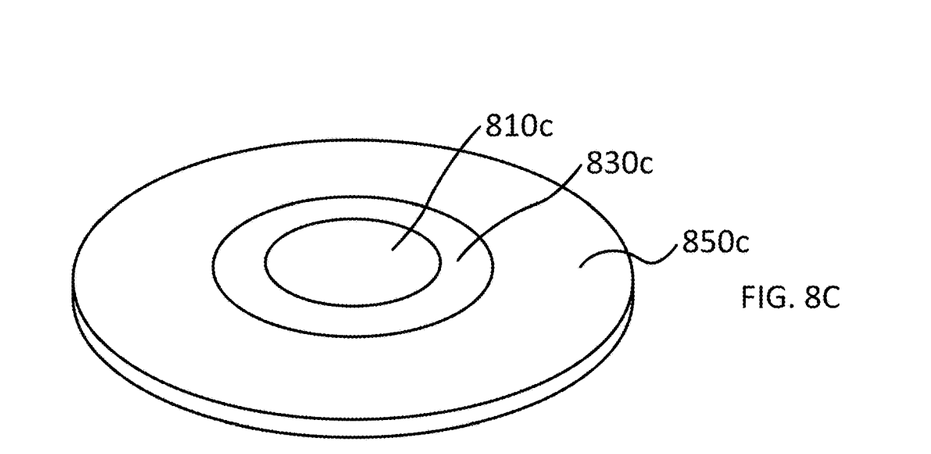

FIG. 8 shows one of many possible features vehicle interior control 800 can have. Vehicle interior control 800 has a collapsibility feature that allows the entire device to become flush with the surface in which the device is placed. In this example, vehicle interior control 800 is collapsed by pressing center 810 with additional force than is required to simply actuate it. In some embodiments, the collapsibility feature can be triggered through an input at a similar or different location. In some embodiments, vehicle interior control 800 is collapsed first by center button 810 collapsing into inner display 830, and subsequently by inner display 830 collapsing into outer display 850. In some embodiments, these two collapsing sequences may occur simultaneously or in reverse order.

Figure 9:
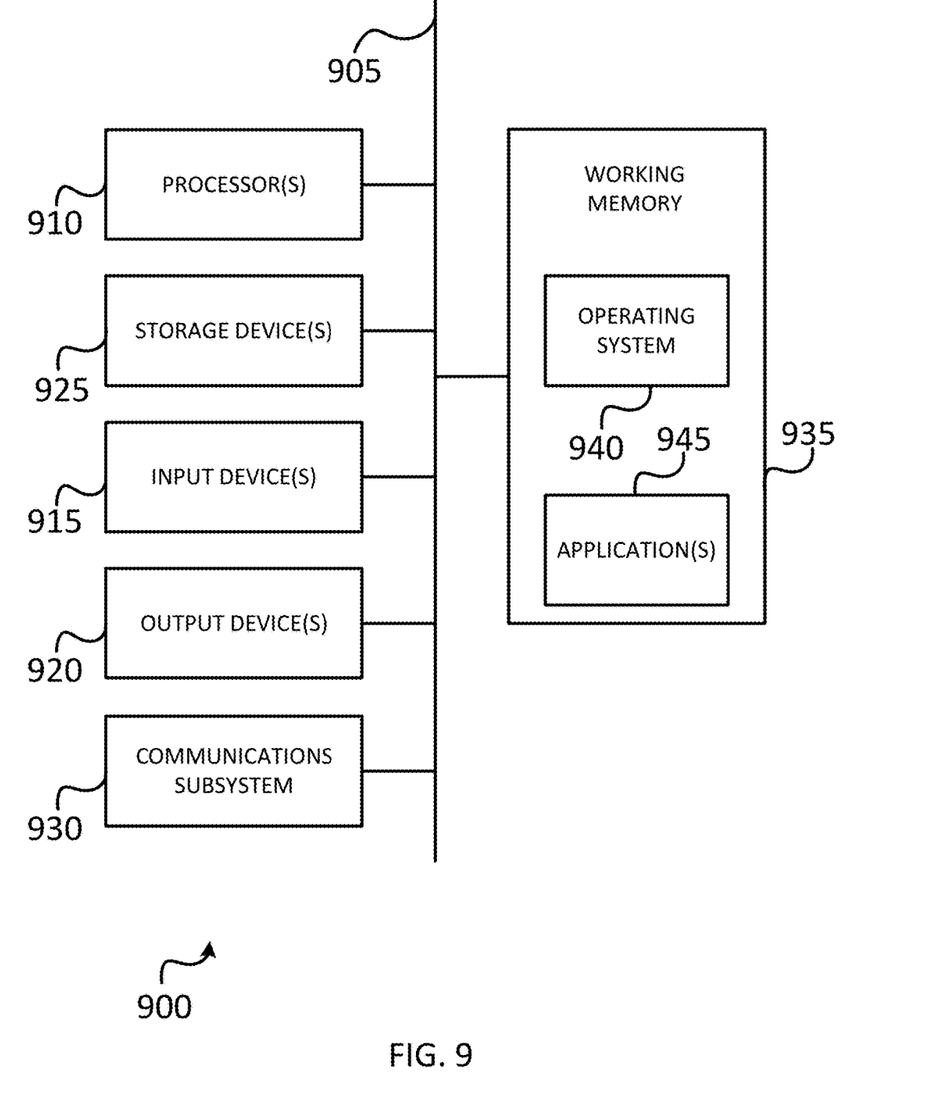
FIG. 9 shows a simplified computer system, according to an exemplary embodiment of the present disclosure.

FIG. 9 illustrates an embodiment of a computer system 900. A computer system 900 as illustrated in FIG. 9 may be incorporated into devices such as a portable electronic device, mobile phone, or other device as described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into the computer system 900, e.g., an electronic device as an input device 915. In some embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium.

Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A vehicle interior control comprising:
   a button for selecting a mode from a plurality of modes provided by the vehicle interior control, the plurality of modes including a first mode, wherein the first button is configured to be actuated;
   a first knob, disposed behind the button, for selecting a function from a plurality of functions provided by the vehicle interior control, the plurality of functions including a first function, wherein the first knob is configured to rotate into a first set of rotational positions including a first rotational position;
   a second knob, disposed behind the first knob, for selecting a parameter value from a plurality of parameter values, the plurality of parameter values including a first parameter value, wherein the second knob is configured to rotate into a second set of rotational positions including a second rotational position; and
   a processor configured to generate instructions to effectuate the vehicle interior control such that in response to the selection of the first mode via the button, the first function via the first knob, and the first parameter value via the second knob, an instruction is generated to effectuate a control based on the first mode, the first function, and the first parameter value, wherein the button, the first knob, and the second knob are capable of collapsing and creating a substantially planar surface that is substantially flush with an outer surface.

2. The vehicle interior control of claim 1, wherein the button and the first knob are physically fastened together such that by pressing the button, the first knob is also pressed, and by rotating the first knob, the button is also rotated.

3. The vehicle interior control of claim 1, wherein the vehicle is an electric vehicle.

4. The vehicle interior control of claim 1, wherein the button, the first knob, and the second knob are of circular shapes.

5. The vehicle interior control of claim 1, further comprising:
a button display, disposed on a surface of the button, configured to display representations of the plurality of modes.

6. The vehicle interior control of claim 5, wherein the button display only displays the first mode of the plurality of modes.

7. The vehicle interior control of claim 5, wherein the plurality of modes includes a driver mode.

8. The vehicle interior control of claim 5, wherein the plurality of modes includes a passenger mode.

9. The vehicle interior control of claim 1, further comprising:
an inner display, disposed behind the first knob, configured to display representations of the plurality of functions.

10. The vehicle interior control of claim 9, wherein the inner display only displays the first function of the plurality of functions.

11. The vehicle interior control of claim 9, wherein the plurality of functions includes air temperature, wind magnitude, and wind direction.

12. The vehicle interior control of claim 9, wherein the plurality of functions includes seat adjustment and seat temperature.

13. The vehicle interior control of claim 1, wherein the outer surface is an outer display.

14. The vehicle interior control of claim 1, wherein the first knob and the second knob are configured to rotate into a discrete set of rotational positions.

15. The vehicle interior control of claim 1, wherein the first knob and the second knob are configured to rotate into a continuous set of rotational positions.

* * * * *